US009530008B2

(12) United States Patent
Helmschmidt et al.

(10) Patent No.: US 9,530,008 B2
(45) Date of Patent: Dec. 27, 2016

(54) SYSTEM AND METHOD FOR A PROCESSING DEVICE WITH A PRIORITY INTERRUPT

(71) Applicant: Infineon Technologies AG, Neubiberg (DE)

(72) Inventors: Juergen Helmschmidt, Gilching (DE); Fabio Parodi, Genoa (IT); Stephan Schoenfeldt, Hoehenkrichen-Siegertsbrunn (DE); Sergio Rossi, Genoa (IT)

(73) Assignee: Infineon Technologies AG, Neubiberg (DE)

( * ) Notice: Subject to any disclaimer, the term of this patent is extended or adjusted under 35 U.S.C. 154(b) by 632 days.

(21) Appl. No.: 13/904,957

(22) Filed: May 29, 2013

(65) Prior Publication Data

US 2014/0359186 A1    Dec. 4, 2014

(51) Int. Cl.
| G06F 13/26 | (2006.01) |
| G06F 21/60 | (2013.01) |
| H04L 9/32  | (2006.01) |
| G06F 21/72 | (2013.01) |
| G06F 21/74 | (2013.01) |
| G01R 22/10 | (2006.01) |
| G06F 21/57 | (2013.01) |

(52) U.S. Cl.
CPC .............. *G06F 21/60* (2013.01); *G06F 13/26* (2013.01); *G06F 21/602* (2013.01); *G06F 21/604* (2013.01); *G06F 21/725* (2013.01); *G06F 21/74* (2013.01); *H04L 9/3247* (2013.01); *G01R 22/10* (2013.01); *G06F 21/575* (2013.01); *H04L 2209/12* (2013.01); *Y02B 60/1228* (2013.01)

(58) Field of Classification Search
CPC .......... G06F 13/26; G06F 21/00; G06F 21/60; G06F 21/602; G06F 21/604; G01R 22/10
USPC .................... 710/261, 264; 702/61
See application file for complete search history.

(56) References Cited

U.S. PATENT DOCUMENTS

| 6,453,278 | B1* | 9/2002 | Favor ........................ G06F 7/74 703/26 |
| 7,117,284 | B2* | 10/2006 | Watt ...................... G06F 9/4812 710/261 |
| 8,943,251 | B2* | 1/2015 | Schoenfeldt ........ G06F 12/0223 710/260 |
| 2004/0243783 | A1* | 12/2004 | Ding ................... G06F 12/1491 711/170 |
| 2005/0052280 | A1* | 3/2005 | Fukushima ............. G06F 21/54 340/425.5 |
| 2005/0240701 | A1* | 10/2005 | Kuboshima ............ G06F 13/24 710/260 |
| 2013/0254881 | A1 | 9/2013 | Helmschmidt et al. |
| 2013/0254896 | A1 | 9/2013 | Helmschmidt et al. |
| 2013/0304958 | A1 | 11/2013 | Schoenfeldt et al. |
| 2015/0006096 | A1 | 1/2015 | Helmschmidt |

* cited by examiner

*Primary Examiner* — Glenn A Auve
(74) *Attorney, Agent, or Firm* — Slater Matsil, LLP

(57) ABSTRACT

In accordance with an embodiment, a method of operating a processor includes operating in a first operating mode that prohibits access to a protected memory area, receiving a priority interrupt (PI) signal, operating in a second operating mode in response to receiving the PI signal, and executing a first routine by asserting a semi-privileged interrupt (SPI). Access to the protected memory area is permitted in the second operating mode, and the first routine operates in the second operating mode and is interruptible by the PI signal.

28 Claims, 6 Drawing Sheets

SYSTEM AND METHOD FOR A PROCESSING DEVICE WITH A PRIORITY INTERRUPT

TECHNICAL FIELD

The present disclosure relates generally to an electronic device, and more particularly to a system and method for a processing device with a priority interrupt.

BACKGROUND

Automatic meter reading (AMR) has been introduced by utility providers, such as energy, water or gas providers, for example, in order to be able to automatically collect consumption, diagnostic and status data from energy, water or gas metering devices. These data are transferred to a central database for billing, troubleshooting and analyzing, which makes information about consumption available almost on a real-time basis. This timely information coupled with analysis may help both utility providers and consumers to better control the use and production of electric energy, gas usage or water consumption.

Analog meters of previous generations, such as Ferraris analog counters that were used to measure electric power consumption, possessed a one-to-one relationship between the energy consumption and the turning wheel inside the counter. Thus, it was simple matter for an electric power customer or electric utility company to monitor ongoing power consumption and the validity of the metered electric consumption. For example, the electric power customer can simply compare the meter readings listed on the electric bill with the actual meter reading. In systems that electronically implement automatic meter reading, it may be more difficult for the customer or service provider to verify whether the power consumption detected by the electronic meter and the billed power is in line with each other or whether the reported electric power consumption data logged or transmitted by the electronic meter has been modified or tampered with. Such tampering may be the result of a user attempting to manipulate the logged data in order to reduce a utility bill, or the tampering may be a result of a supplier attempting to increase a customer's bill.

SUMMARY OF THE INVENTION

In accordance with an embodiment, a method of operating a processor includes operating in a first operating mode that prohibits access to a protected memory area, receiving a priority interrupt (PI) signal, operating in a second operating mode in response to receiving the PI signal, and executing a first routine by asserting a semi-privileged interrupt (SPI). Access to the protected memory area is permitted in the second operating mode, and the first routine operates in the second operating mode and is interruptible by the PI signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a smart electric meter that provides verifiable measurement data. The invention may also be applied, however, to other applications including, but not limited to electricity, gas and water meters, remote sensing systems, data logging applications, data processing systems, and other systems that provide verifiable recorded data.

Figure 1:
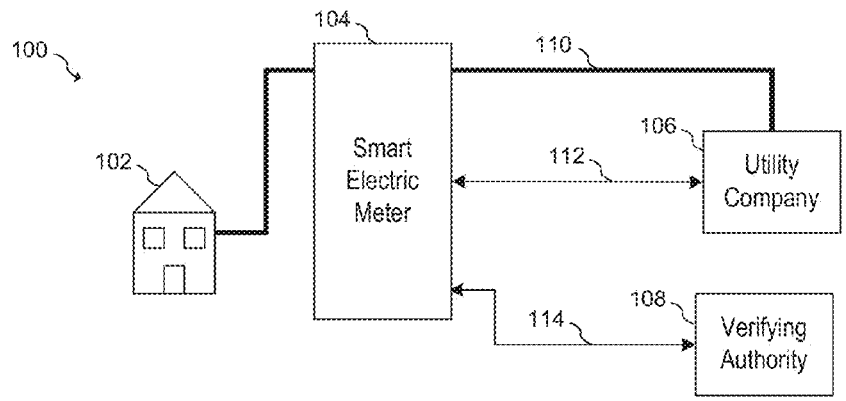
FIG. 1 illustrates a block diagram of an embodiment power distribution system.

FIG. 1 illustrates an example power distribution system 100 according to an embodiment of the present invention. As shown, customer 102 receives power from utility company 106 via power line 110 and smart electric meter 104 that measures the power consumed by customer 102. Smart electric meter 104 may reside, for example, within a building or residence of the customer 102. In some embodiments, smart electric meter 104 is configured to switch on and off the power supply of the customer 102. Metering data is sent to the utility company via communication link 112. Communication link 112 may be a wireless communication link, a telephone link, a wired Internet link, a power line data communication link, or a dedicated wired link, or other communication link. During normal operation, smart electric meter 104 sends utility company 106 data that represents the amount of power consumed by customer 102. This data may be sent at predetermined intervals, and may represent values such as real power, reactive power, apparent power, power factor, harmonic power consumption, system status information and other data. Accordingly, utility company 106 may use this data for billing purposes and/or for the purposes of monitoring the overall integrity of the power distribution system. For example, utility company 106 may use power factor information and harmonic power consumption to determine the efficiency of power delivered to customer 102, and may adjust the power distribution system based on these received measurements.

In an embodiment, smart electric meter 104 is also in communication with verifying authority 108, which may be a public, private, or governmental organization tasked with verifying the integrity of the measurements made by smart electric meter 104. Situations in which measurements made by smart electric meter 104 may lose integrity are, for example, in situations where smart electric meter 104 has been damaged, or has been tampered with. Tampering may potentially occur on the part of both electric customer 102 and utility company 106. For example, customer 102 may tamper with electric smart meter 104 in order that measurement data sent by smart electric meter 104 under reports the amount of power consumed. Tampering by the customer 102 might include attempting to reprogram smart electric meter 104, or physically bypassing smart electric meter 104.

On the other hand, utility company 106 may be motivated to adjust smart electric meter 104 in order to report a higher electric consumption than was really consumed. Tampering by utility company 106 may include, for example, modifying the software and/or hardware within smart electric meter 104. In cases where utility company 106 provides and/or manufactures smart electric meter 104, software or hardware within smart electric meter may be specifically designed to falsity the actual amount of power consumed.

In embodiments of the present invention, there are a number of ways in which verifying authority 108 may verify the integrity of the measurements made by smart electric meter 104. One way that verification may be done is by downloading measurement samples that have a verifiable encrypted signature, verifying the signature, recalculating consumption measurements, and comparing the recalculated measurements with reported consumption measurements. If the recalculated consumption measurements are within a margin of error of the measurements reported by the smart meter and/or the utility, the reported measurements may be considered valid. If, on the other hand, the recalculated measurements are outside of the margin of error, then a possibility of tampering has been detected. In such embodiments, smart electric meter 104 is configured to electronically signed data samples using hardware and software that cannot be tampered with or modified. These electronically signed data samples may represent raw data measurements made by smart electric meter of currents and voltages on power line 110 before further processing is performed. These electronically signed data samples may be transmitted to verifying authority 108 via communication channel 114 and/or stored within memory on smart electric meter 104 for later inspection by the customer 102, utility company 106 and/or verifying authority 108. Communication channel 114 may be implemented, for example, using a Universal Asynchronous Receiver-Transmitter (UART), serial communication interface, or a wireless or wire line network interface. Raw data measurements may include consecutive raw data measurements and/or raw data measurements that are sent or recorded at random intervals. In some embodiments, smart electric meter 104 may be configured to send electronically signed data that represents fully calculated measurements. Electronic signatures may be generated, for example, using encrypted electronic signature techniques and methods known in the art. For example, data may be signed using hash values and/or encrypted using symmetric or asymmetric cryptographic algorithms such as the advanced encryption standard (AES), a Rivest, Shamir, & Adleman (RSA) algorithm, SHA1/256, Hamming Code, Message-Digest Algorithm (MD5) or elliptic curve cryptography (ECC) method.

Once verifying authority 108 has received electronically signed data, authority 108 may compare the received electronically signed data with data received from utility company 106 or measurement data generated by smart electric meter 104. In embodiments in which electronically signed raw data is used by verifying authority 108 in order to verify the integrity of smart electric meter 104, measurement and metrology algorithms implemented by smart electric meter 104 are reproduced by verifying authority 108, and the results of these reconstructed measurements are compared to measurements produced by smart electric meter 104 and/or power measurements received by utility company 106. Tampering may become apparent, for example, if the reconstructed power measurements do not match, or are not within an acceptable margin of error or margin of deviation of measurements produced by smart electric meter 104, and or measurements reported by utility company 106. It should be understood that the embodiment system of FIG. 1 may also be applicable to other types of measurements. For example, in some embodiments, other utility types may be measured such as natural gas, water or any kind of consumed liquids. Embodiment concepts may also be used to measure other variables and verify the measurements.

Figure 2:
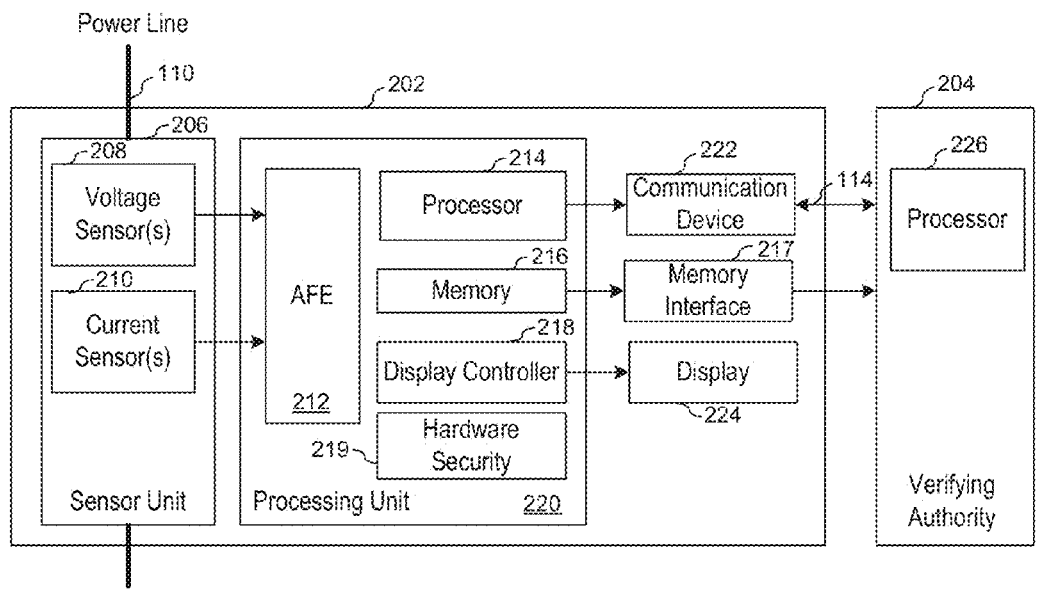
FIG. 2 illustrates a block diagram of an embodiment smart meter.

FIG. 2 illustrates embodiment smart electric meter 202 coupled to verifying authority 204. Smart electric meter 202 includes sensor unit 206, processing unit 220, communication device 222 and display 224. Sensor unit 206 is coupled to power line 110 and includes one or more voltage sensors 208 and one or more current sensors 210. In embodiments directed toward measuring electrical power, current sensors 210 may be implemented, for example, using a hall sensor to measure a magnetic field of the power line. In alternative embodiments of the present invention, sensor unit 206 may be implemented using, for example, a turning wheel detector in the case of a gas meter, or a flow sensor or a turning wheel detector or other sensor type in the case of a water meter. Each of voltage sensors 208 and current sensors 210 produce an analog signal that is coupled to analog front-end (AFE) 212 within processing unit 220. AFE 212 may include, for example, one or more analog to digital converters that converts the analog output from voltage sensors 208 and current sensors 210 to a digital representation. Processor 214 performs operations on data produced by AFE 212. These operations may include, for example, data logging, execution of metrology algorithms, encrypted signature generation of either raw data or measure data, and other system tasks. During operation, processor 214 may read and write data from and to memory 216. Communication device 222 is configured to transmit and receive data to and from verifying authority 204 and or the utility company (not shown). Communication device 222 may include, for example, a wireless and/or wire line interface. Example interfaces may include, but are not limited to near distance communication interfaces such as Wireless M-Bus, M-Bus, ZigBee, and Power Line Communication (PLC) interfaces, and far distance communication interfaces such as PSTN, GSM, UMTS, and WLAN.

In an embodiment, display 224 provides a visual interface that shows the amount of power measured by smart meter 202. Display 224 may include, for example, in liquid crystal display (LCD) that is controlled by display controller 218. Alternatively, other display types may be used and/or measured meter data may be fed into an in-house data communication network. Hardware security block 219 may be provided to provide hardware-based encryption support for encrypting and decrypting data, and generating verification signatures. In addition, hardware security block 219 may also provide hardware-based support to software-based encryption routines executed on processor 214. One such example of hardware-based support is a True Random Number Generator, the output of which may be used by encryption algorithms such as Elliptic Curve Cryptography (ECC). Hardware security block 219 may function, for example, as an accelerator or coprocessor or may implement an entire cryptographic algorithm in total.

Verifying authority 204 receives data from communication device 222 via communication channel 114. In some embodiments, verifying authority 204 may transmit data to smart meter 202, for example, to request signed measurement data and system status. Verifying authority 204 may also be coupled to memory 216 in situations where the contents of memory 216 are locally downloaded to authority 204 via memory interface 217. The memory used to store such contents may be non-volatile memory, such as flash memory. Alternatively, other memory types may be used. In some embodiments, verifying authority 204 may be implemented using, for example, a computer and/or processor 226. In some embodiments, verifying authority 204 may be coupled to smart meter 202 via a network such as a wide area network or the Internet. In some embodiments, smart meter 202 may also be configured to be in communication with a local area network (LAN), for example, via a Wi-Fi connection or a wired LAN connection, such as an Ethernet connection. In some embodiments, smart meter 202 may transmit power consumption measurements and statistics to electric customer 102 via a LAN, so that electric customer can monitor power usage. In some embodiments, systems, methods and techniques may be incorporated that are described in U.S. patent application Ser. No. 13/428,718 entitled, "Method to Detect Tampering of Data," filed on Mar. 23, 2012; and in U.S. patent application Ser. No. 13/459,772 entitled, "Method to Detect Tampering of Data," filed on Apr. 30, 2012, which applications are incorporated herein by reference in their entirety.

In embodiments of the present invention, data that is subject to later verification, such as signed raw data or signed measurement data, is processed in a way that prevents tampering by non-trusted software and/or non-authorized users. One way in which this data is protected is by operating embodiment systems in a protected mode that allows writing to protected areas of memory and access to critical system resources by trusted hardware and software routines, but prevents access by non-trusted hardware and software. In embodiments, a priority interrupt generated by AFE 212 is used to place processor 214 in a protected mode. In this protected mode, processor 214 may write raw data generated by AFE 212 and perform trusted operations on this raw data. Once processor 214 is finished executing trusted software routines, the processor exits the protected mode and secures various resources of processing unit 220 to prevent tampering. Securable resources of processing unit 220 may include, but are not limited to, write and/or read access to portions of random access memory (RAM), static random access memory (SRAM), nonvolatile memory such as flash memory, system configuration registers, configuration and access to various peripherals, test modes, and other system resources.

Figure 3:
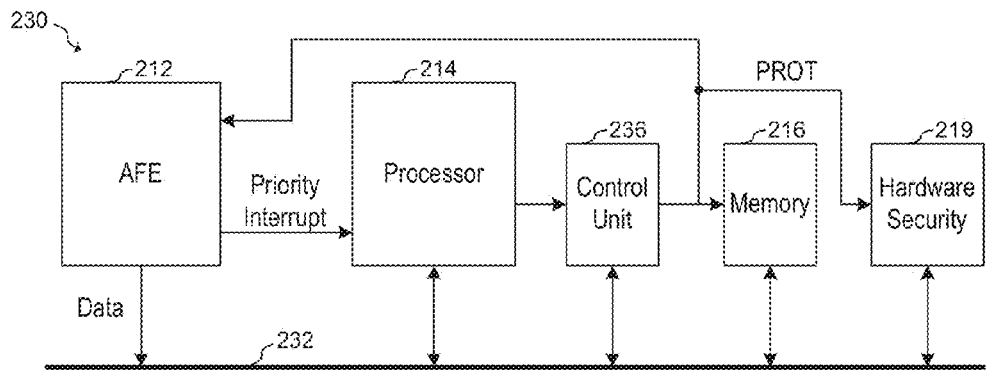
FIG. 3 illustrates a further block diagram of an embodiment smart meter.

The priority interrupt that places processor 214 in the protected mode may be implemented using the highest priority interrupt below reset. In some processing systems, this priority interrupt is a non-maskable interrupt (NMI). FIG. 3 illustrates a smart meter system 230 according to an embodiment of the present invention that further illustrates the hardware blocks involved in protected mode operation.

As shown, smart meter system 230 includes, AFE 212, processor 214, control unit 236, memory 216 and bus 232. In embodiments, a priority interrupt is generated each time AFE 212 outputs a measurement sample, which can occur, for example, at sampling rates of between about 1 kHz to about 4 kHz in electric metering applications. This priority interrupt is received by processor 214 that, in turn, signals a request to control unit 236 indicating that protected mode of operation is needed.

Once control unit 236 receives notification to place system 230 into protected mode, AFE 212, memory 216 and hardware security block 219 are placed in a protected mode via signal PROT. In protected mode, portions of memory 216 that may otherwise be inaccessible are made accessible to processor 214 via bus 232. Examples of protected memory resources may include, for example, portions of SRAM that are used to temporarily store raw data samples, portions of SRAM that are used to compute encrypted data signatures, portions of non-volatile memory used to store private encryption keys, and portions of memory used to store trusted processing routines. In the protected mode access to AFE 212 and hardware security block 219 are allowed by the protected device.

Control unit 236 may also enable other system resources that are otherwise inaccessible during protected mode operation. For example, a watchdog timer (WDT) of the system may be made inaccessible from unprotected code to prevent system tampering via the assertion or frequent and unwanted resets. In addition, a system control unit (SCU), clock generation unit (CGU), configuration encryption unit (CEU), the real-time clock (RTC), the power mode unit (PMU) and the display unit may be secured during normal operation and made accessible during protected mode operation. Keeping the operation for these blocks protected helps to provide a more secure system since the SCU controls the switching between normal mode operation and secured mode operation, and the CGU and the CEU may be subject to tampering attacks. Securing the RTC and the PMU may prevent the system from being shut down during operation, and securing the display unit helps ensure that correct power consumption values are displayed.

As mentioned above, AFE 212 asserts a priority interrupt every time a new sample is ready, which could occur at intervals of 1 ms or less depending on the sample rate of AFE 212. For example, sampling rates of 2 KHz, 4 KHz and 8 KHz may be used. In some embodiments, samples may be synchronously aligned with the zero crossing point of the measured voltage waveform or sampling may be performed asynchronously. Higher and lower sampling rates may also be implemented depending on the particular system, specification and power requirements. In embodiments where a digital signature is assigned to sets of raw data samples, however, encryption or hashing processing may take a few seconds, which far exceeds the sampling interval for AFE 212. In order to ensure privileged mode operation for encryption algorithms, or for routines requiring execution times exceeding the sampling interval of AFE 212, a semi-privileged interrupt mechanism is used. In an embodiment, a routine running under a privileged interrupt may assert a semi-privileged interrupt. This semi-privileged interrupt is one interrupt level lower than the privileged interrupt. Routines running in response to a semi-privileged interrupt may be executed in this privileged mode, and may access memory and system resources that are otherwise unavailable in a normal mode of operation. Execution of a routine running in a semi-privileged mode may be interrupted when the privileged interrupt is asserted. For example if an encryption algorithm is running in a semi-privileged mode, and AFE 212 asserts a privileged interrupt, execution of the semi-privileged mode is interrupted, and routines configured to process data provided by AFE 212 are executed under the priority interrupt. During this time, routines operating under the priority interrupt may call non-privileged software routines by exiting the privileged mode and waiting for execution of the non-privileged software routines to finish, after which execution then proceeds to operate in the privileged mode. When execution of the routine that was triggered by AFE 212 finishes, execution of the semi-privileged routine is resumed subject to periodic interruptions by routines operating under the priority interrupt. At the completion of the semi-privileged routine, a system call is made, the privilege mode is exited, and non-privileged user routines may be executed. In an embodiment, protected memory areas and other protected system resources are prevented from being accessed or tampered with by ensuring that the privileged mode has been exited in a manner that prevents access to secured areas is possible until the privileged interrupt is reasserted. This may be accomplished, for example, by having a routine running under the priority interrupt set the interrupt service routine (ISR) pointer of the semi-privileged interrupt to a trivial default position when semi-privileged routines finish operation. In some embodiments, systems and methods may be used that are described in U.S. patent application Ser. No. 13/590,017 entitled, "System and Method for Processing Device with Differentiated Execution Mode," filed on Aug. 20, 2012, which application is incorporated herein by reference in its entirety.

Figure 4:
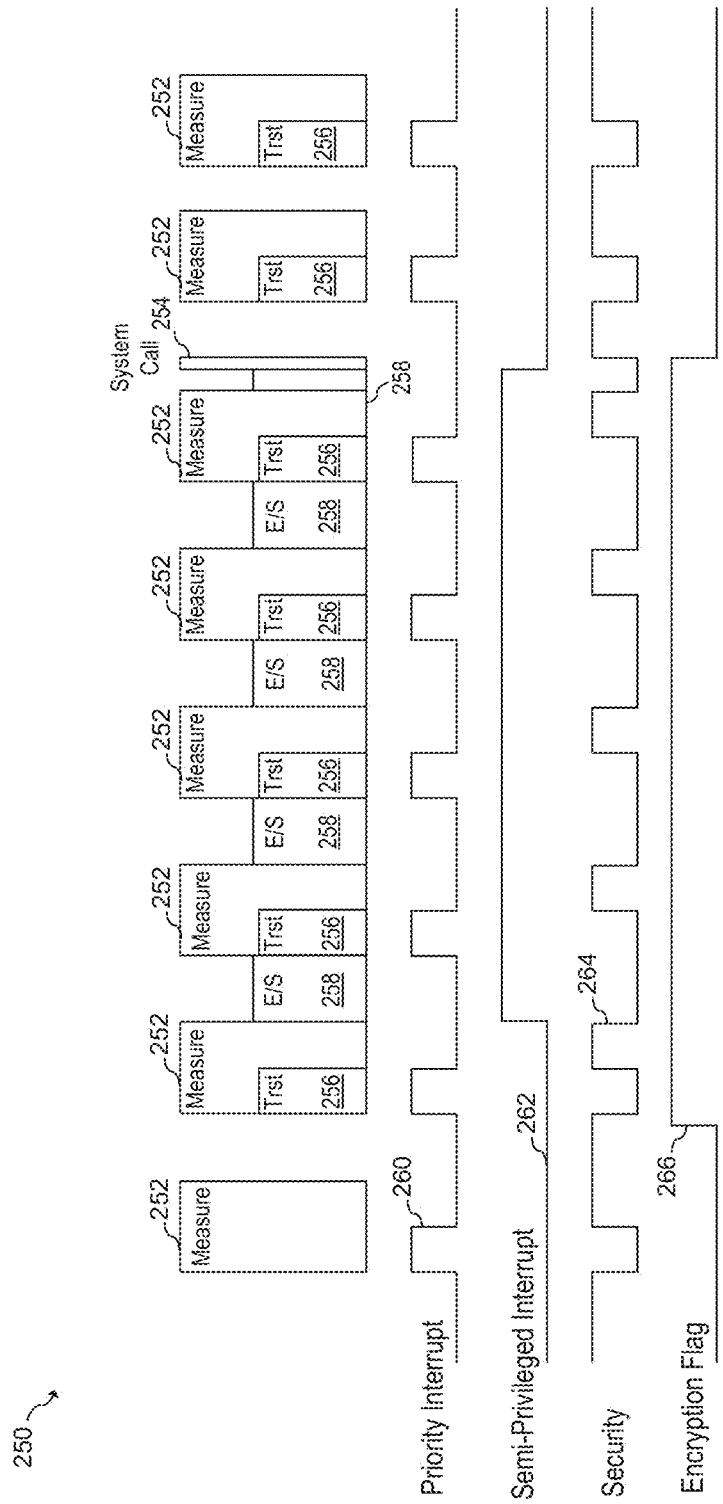
FIG. 4 illustrates a timing diagram of an embodiment smart meter device.

FIG. 4 illustrates a timing diagram 250 that illustrates the relationship between the priority interrupt, the semi-privileged interrupt, and the measurement and encryption and/or signature routines performed by processor 214. As shown, when priority interrupt 260 is asserted, measurement routine 252 is executed. When encryption flag 266 is asserted, for example, when a set of signed measurements is needed, measurement routine 252 activates encryption and/or signature routine 258 by asserting semi-privileged interrupt 262. During this time, the processing system remains in the privileged mode, and use of the processor and its protected resources is not accessible to non-protected user software or hardware. Alternatively, in some embodiments, encryption and/or signature routine 258 may assert one or more additional interrupts to provide for the execution of other routines that operate in a privileged mode. As mentioned above, encryption and/or signature routine 258 may be interrupted by other assertions of priority interrupt 260 that indicate more data is available from AFE 212. Once the encryption and/or signature routine 258 is complete, system call 254 is executed and the processor is again available to user software and resources that operate in a normal mode of operation.

Security signal 264 indicates the access state of secured resources within processing unit 220. When security signal 264 is high, protected memory areas and other system resources are not accessible. On the other hand, when the security signal 264 is low, such protected resources are available. As shown, the security signal is low during the times that trusted portions 256 of measure routine 252 are being executed and during the times that encryption and/or signature routine 258 is being executed. Times during which non-trusted measurement routines are executed, and during times that the processor is available for user routines, security signal 264 is high indicating that these resources are inaccessible. In embodiments, security signal 264 may be implemented by one or more register bits within the system it should be further understood that, in some embodiments, security signal 264 may be implemented as an active low signal instead of the active high signal described herein.

Figure 5A:
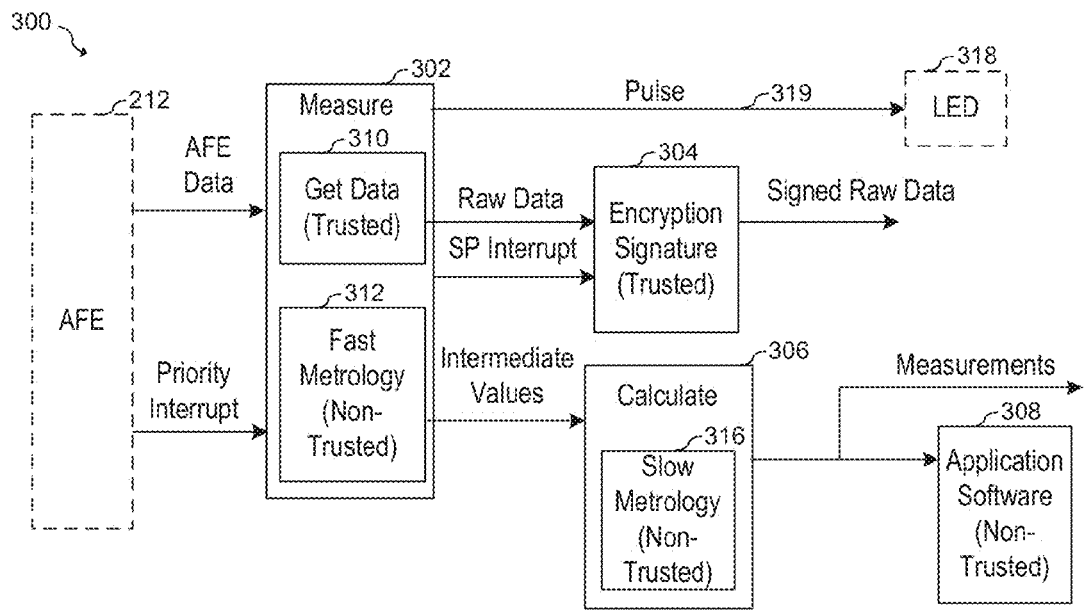
FIGS. 5a-b illustrate module diagrams of an embodiment smart meter.

FIG. 5*a* illustrates a module diagram 300 showing the interaction between software modules for an embodiment in which a privileged interrupt calls a non-trusted algorithm. In an embodiment, measure routine 302 receives data from AFE 212 along with the assertion of a priority interrupt. At the receipt of the priority interrupt, measure routine 302 writes data generated by AFE 212 into local protected SRAM using get data routine 310. Next, fast metrology routine 312 is performed. This fast metrology algorithm may calculate, for example, zero crossing points of the voltages and currents measured by AFE 212 and provide intermediate calculations or variables that are used by slow metrology routine 316 to calculate power consumption, preliminary raw un-calibrated energy measurements, and other calculated variables. In embodiments directed toward other measurement types. The preliminary raw uncalibrated energy, gas, and/or water counting is also done here during fast metrology routine 312. In an embodiment, measure routine 302 is executed each time AFE 212 provides a sample and the priority interrupt. This may occur at a sampling rate of for example, 1 kHz, 2 kHz, 4 kHz, or another sampling rate. When measure routine 302 calls fast metrology routine 312, access to protected areas of memory and other system resources is prevented. In some embodiments, measure routine 302 provides pulse signal 319 that illuminates LED 318 at predetermined power consumption intervals. When pulse signal is generated using trusted code, the time intervals at which LED 318 is illuminated may be used by customer 102 or verifying authority 108 to visually verify the accuracy and operation of the smart meter.

After a predetermined number of samples have been processed by measure routine 302 including fast metrology routine 312, calculate routine 306 include slow metrology routine 316 may be executed to determine a set of calculated variables such as power consumption, power factor, harmonic power and other calculated variables. In some embodiments, calculate routine 306 is executed after intermediate values from a full waveform cycle have been collected. In some embodiments, calculate routine is executed after between about 10 and 80 samples have been collected by measure routine 302. Alternatively, calculate routine may be executed after greater than 80 or fewer than 10 samples have been collected.

When signed raw data is requested, for example, by verifying authority 108, or is scheduled to be sent out, a flag is set using a non-trusted software routine. When measure routine 302 recognizes that this flag has been set, measure routine 302 executes trusted encryption routine 304 by asserting a semi-privileged interrupt. Execution of encryption routine 304 proceeds until a signature for a set of raw data has been generated. In one example, the signature is generated for a few thousand samples of raw data that may represent a few seconds of sample data. Encryption routine 304 reads raw data samples from protected SRAM areas and computes a digital signature using a private key that is also stored in protected memory that cannot be otherwise accessed using user software. Once the digital signature has been calculated, the raw data samples in the digital signature may be written, for example, to memory or sent out via communication device 222. When execution of encryption routine 304 has been completed, the protected mode is exited and protected areas of memory and other system resources are made inaccessible. During periods of time in which measure routine 302 and encryption routine 304 are not being executed, non-trusted application software 308 may be executed. Non-trusted application software 308 may include, for example, software directed toward standard serial communications, standard customer billing checks, Fast-Fourier Transform analysis calculations, switching on and off of connected consuming devices, receiving updated pricing information etc.

Figure 5B:
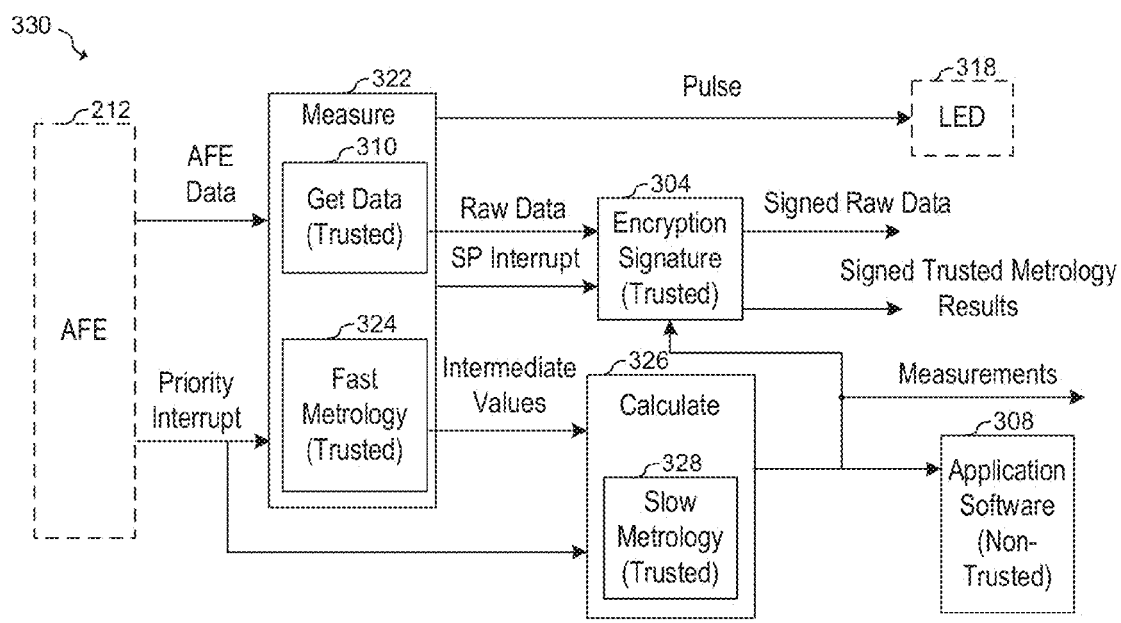

FIG. 5b illustrates module diagram 330 according to an alternative embodiment of the present invention in which both fast and slow metrology routines are implemented using trusted code stored in protected memory. Here, fast metrology routine 324 within measure routine 322 is executed in a protected mode without disabling access to protected memory and protected system resources. In an embodiment, during protected mode operation, operation proceeds in a "secured only trusted" manner, such that hash signed code is booted and no backdoors are available that enable a third party to acquire control of the processor during booting, for example, by using a debug interface or other method. Furthermore, calculate routine 326 that calls slow metrology routine 328 also runs without disabling access to protected memory and protected system resources. As such, calculated measurements that emanate from slow metrology routine 328 may also be used as a basis to produce signed trusted metrology results. In an embodiment, encryption routine 304 may produce a digital signature to verify the authenticity of one or more measurement samples produced by calculate routine 326. Signed trusted metrology results, may be transmitted to verifying authority 108 and/or read directly from memory.

Figure 6A:
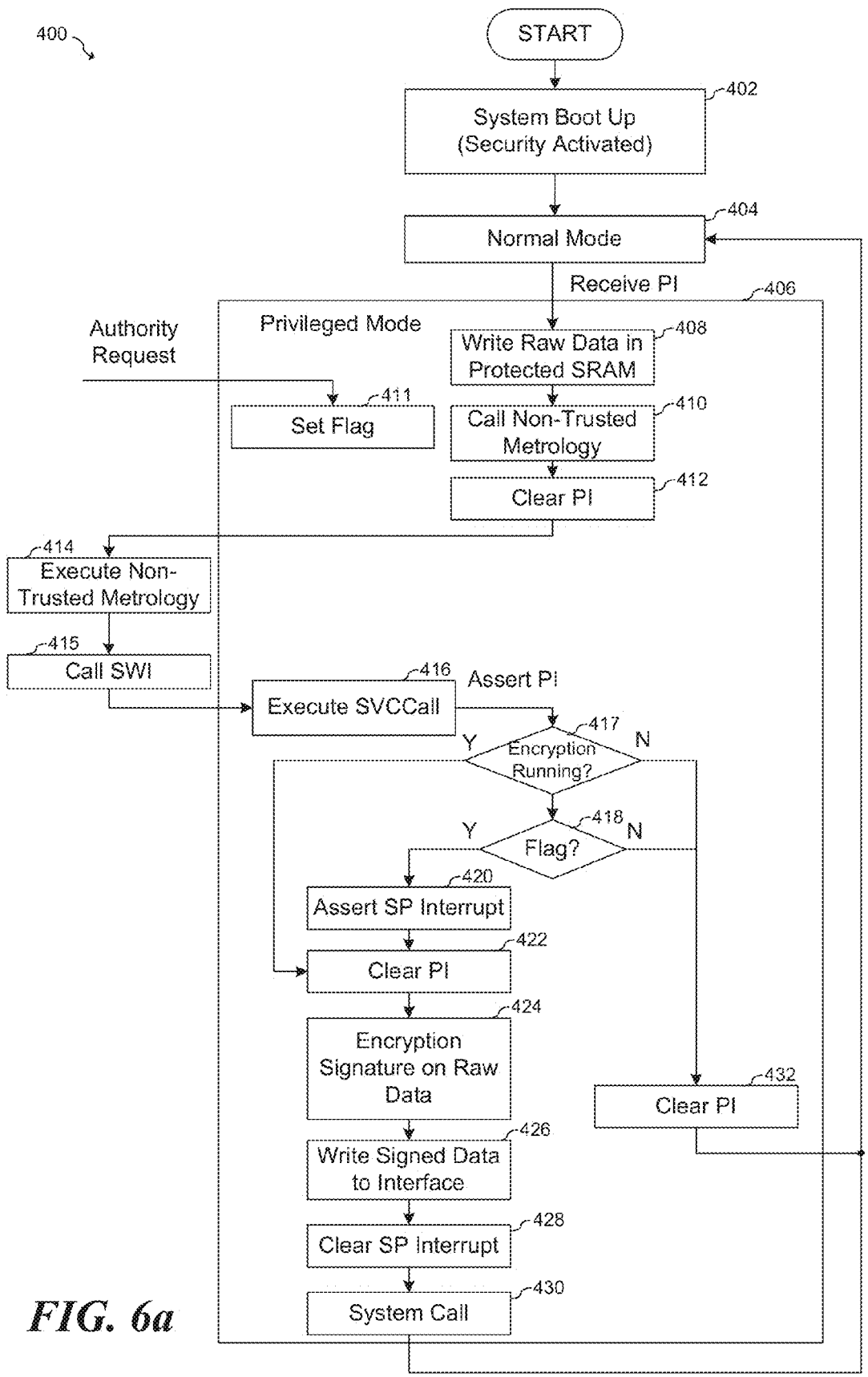
FIGS. 6a-b illustrate block diagrams of embodiment methods.

FIG. 6a illustrates a flowchart 400 of an embodiment method of operating a smart meter. In step 402, the smart meter processing system is booted up. In general, the boot up operation of the processor proceeds using boot up methods known in the art. The processor, however, is configured to commence operation in a protected state. In other words, areas of memory and other system resources that are designated to be protected are in a protected state as soon as the system is booted up. After the system boots up, operation proceeds in a normal mode in step 404. In the normal mode of operation, non-trusted routines, for example, user written routines may be executed. During execution in the normal mode, only unprotected areas of memory and unprotected system resources are accessible by the executed routines. In an embodiment, user routines do not have access to the privileged interrupt or the semi-privileged interrupt.

When the processor receives a privileged interrupt, operation proceeds from normal mode step 404 to privilege mode step 406. In the privileged mode, areas of memory and system resources that were protected during normal mode become available to the processor. The privileged interrupt may be, for example, a non-maskable interrupt (NMI). In embodiments, software routines stored in protected areas of memory may be executed. In embodiments where the priority interrupt is asserted by AFE 212, the raw data produced by AFE 212 is written in protected SRAM. In some embodiments, raw data may be written in other memory types that are protected, such as RAM, or non-volatile memory.

Next, in step 410 a non-trusted portion of code is called in step 410, the priority interrupt is cleared in step 412, and the non-trusted routine, such as a metrology routine, is executed in step 414. In order to call a non-trusted routine, provisions are made to activate security measures to prevent access to protected areas of memory and protected system resources when the non-trusted code is running. As such, step 410 may be implemented by executing a launcher that serves as an initializer-terminator of the interrupt service routine and it is part of the trusted code. After the non-trusted code finishes execution in step 414, non-trusted code calls a function declared as a software interrupt (SWI) in step 415. A function that defines the SWI is replaced by a supervisor call (SVCCall) at compile time having the same priority as the SWI. This SVCCall routine code may be stored in a write-protected part of SRAM such that that SVCCall routine itself is trusted code.

In an embodiment, SVCCall routine calls a software NMI in step 416, and the called NMI routine checks that it has been triggered by a SWI by performing a stack back trace analysis to determine the special purpose program status register (xPSR) register value when the NMI was triggered. If it is determined that the SVCCall was triggered by a SWI, the NMI programs the SVCCall interrupt priority as the highest in the system and lowers all other interrupt priorities in order to ensure that it is not possible to preempt the SWI interrupt. Next, security is related to allow trusted code to access protected areas of memory and other system resource.

In step 417, a determination of whether or not an encryption routine is currently interrupted is performed, and in step 418, a determination is made whether or not a flag requesting a signature for raw data samples has been set. This flag may be set, for example, in step 411 in response to a request from the verifying authority. It should be understood that in some embodiments, verification of measurement data relies primarily on hashing or signing of data to guarantee the integrity of the measurement data. If the encryption and/or signing algorithm has not been interrupted and the flag has not been set, the priority interrupt is cleared in step 432 and normal mode proceeds in step 404 with protected memory and system resources once again being made inaccessible. If the flag has been set, then the semi-private interrupt is asserted in step 420, and the priority interrupt is cleared in step 422. If it is determined the encryption algorithm has been interrupted, then the priority interrupt is cleared in step 422. (Step 420 is skipped because the semi-private interrupt has already been asserted.) Next, an encryption signature routine is executed in step 424 to produce a signature for the raw data samples. In an embodiment, this encryption signature routine calculates a hash or signature verifying the validity of the data samples on which it operates. The encryption routine may utilize a private key that is stored in a protected area of non-volatile memory or RAM that is inaccessible by user routines. If this routine was previously running before an assertion of the priority interrupt, execution continues where it left off before the assertion of the interrupt. Once the encryption signature is calculated, signed data is written to an interface in step 426. The signed data includes the raw data samples and the encryption signature. In some embodiments, data interface may be coupled to a memory. In other embodiments, data may be written to communication device 222 or to another interface. Once the data has been written, the semi-privileged interrupt is cleared in step 428. Next, a system call, such as a semi-privileged interrupt system call, is made to exit the privileged mode and resume normal operation in step 406.

Figure 6B:
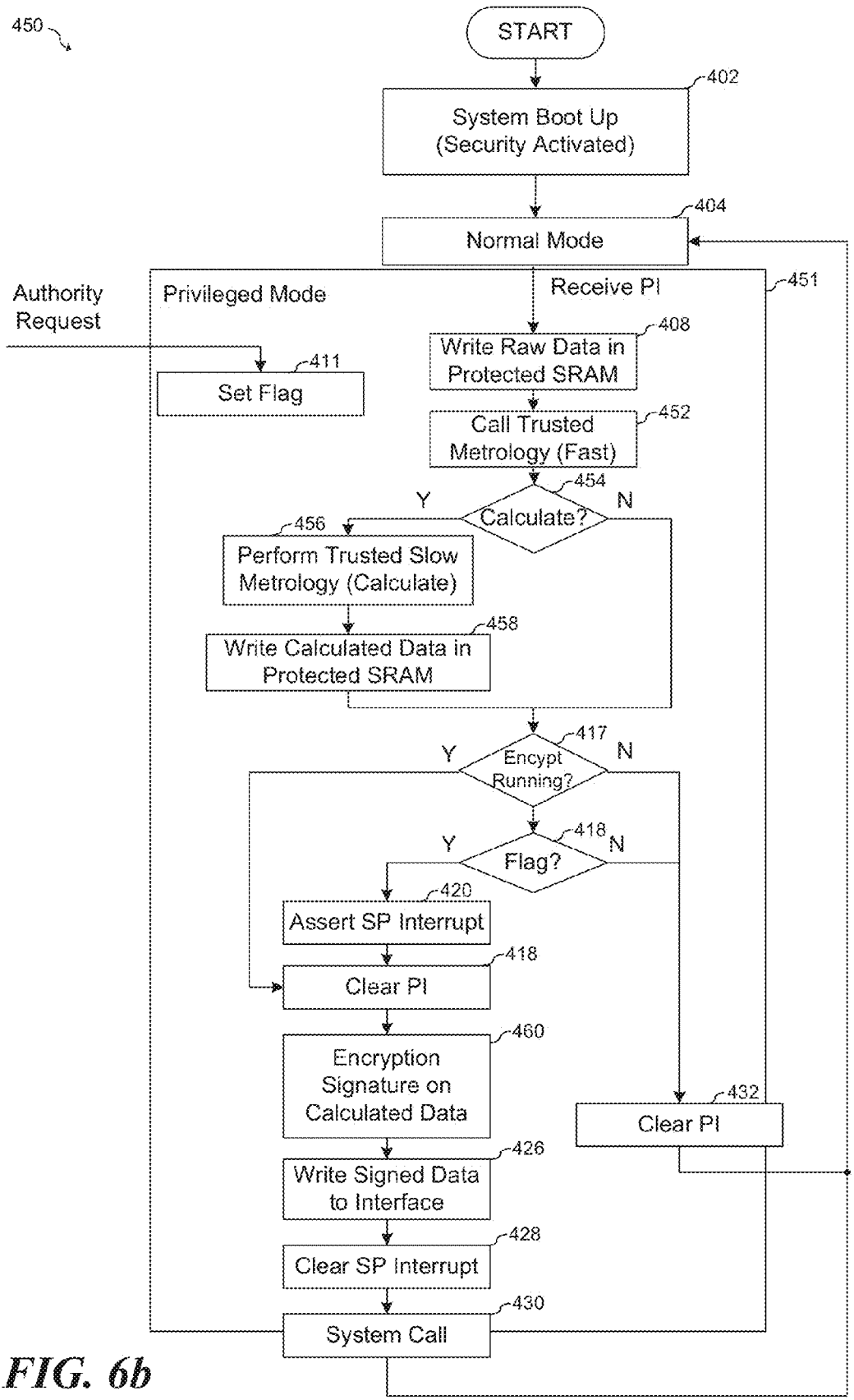

FIG. 6b illustrates flow chart 450 of an embodiment method in which encryption signatures are written on calculated data that was derived using a trusted metrology routine. In an embodiment, the system boots up in step 402 and operates a normal mode in step 404 with protected memory areas and protected system resources unavailable to user routines, as described above with respect to FIG. 6a. When a priority interrupt is received, privileged mode 451 is entered, and raw data provided by AFE 212 is written to protected SRAM in step 408. Next, in step 452 a trusted fast metrology algorithm is executed. This fast metrology algorithm may be written in protected RAM or protected non-volatile memory. In some embodiments, these trusted routines are not accessible via a user code.

Next, in step 454, a determination is made of whether or not it is time to execute the slow metrology routine. In some embodiments, the slow metrology routine is executed after a predetermined number of samples and/or waveform periods have been accumulated. For example, in one embodiment, the slow metrology routine may be executed every 50 or 60 cycles. Alternatively, other intervals may be used. If it is determined that it is time to execute the slow metrology routine, the slow metrology routine is executed in step 456. Next, calculated data is written in protected SRAM and 458. If it is not time to execute the slow metrology routine, step 456 and 458 are bypassed. Steps 411, 417, 418, 420, 422, and 432 proceed as described above with respect to FIG. 6*a*. In step 460, the encryption signature routine is executed on calculated data in protected memory. This calculated data may be the result of the fast metrology algorithm or the slow metrology algorithm depending on the particular embodiment and its specifications. The signature may be applied to single samples and/or may be applied to sets of two or more samples. Next, steps 426, 428 and 430 are performed as described above with respect to FIG. 6*a*.

Figure 7:
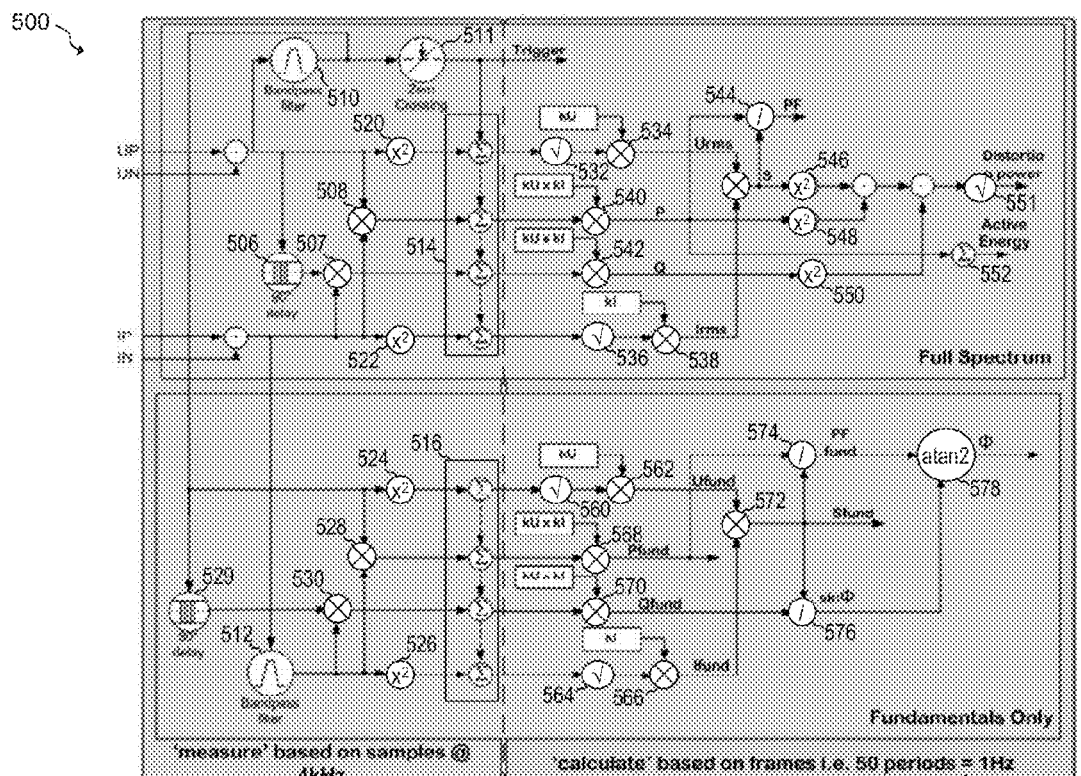
FIG. 7 illustrates a block diagram of embodiment metrology algorithms.

FIG. 7 illustrates a block diagram 500 that summarizes calculations made during fast metrology routine 502 and slow metrology routine 504. In an embodiment, voltage samples UP and UN representing a sensed line voltage, and current samples IP and IN representing a sensed line current are bandpass filtered by filters 510 and 512, respectively. A squared input voltage calculated by scoring block 520, a squared input current calculated by scoring block 522, a real power calculated by multiplication block 508, and reactive power calculated by 90° phase shift block 506 and multiplication block 507 are determined to provide full spectrum power measurements.

For power measurements that operate only on the waveform, squaring block 524 is used to calculate a squared fundamental voltage, scoring block 526 is used to calculate a squared filtered current input, multiplication block 528 is used to calculate a real fundamental power, and phase shift block 529 and multiplication block 530 are used to calculate a reactive power at the fundamental frequency. Each of these power measurements are calculated by fast metrology routine 502 or accumulated using accumulator 514 for full-spectrum measurements and accumulator 516 for fundamental measurements. At the end of each sine wave cycle, as detected by zero crossing detector 511 at the output of filter 510, the contents of accumulators 514 and 516 are transferred to slow metrology routine 504. In some embodiments, the contents of accumulators 514 and 516 are reset at the end of each voltage cycle.

In an embodiment, slow metrology routine 504 performs calculations at the end of a predetermined number of sine wave cycles. For example, in one embodiment slow metrology routine 504 operates at a rate of 1 Hz, or every 50 sine wave cycles for power systems in Europe, or every 60 sine wave cycles for power systems in the United States. In alternative embodiments of the present invention slow metrology algorithm 504 may operate at different intervals. In an embodiment, a full-spectrum root-mean-square (RMS) measurement of the input voltage is calculated by taking the square root of the accumulated square voltage measurement and scaling with scale factor kU to produce variable Urms via square root block 532 and multiplier 534. Likewise, a full-spectrum RMS measurement of the input current is calculated by taking the square root of the accumulated square current measurement and scaling with scale factor kI to produce variable Irms using square root block 536 and multiplier 538. Full spectrum real power P is calculated using multiplier 540 and scale factors Ku and KI, and full spectrum reactive power is calculated using multiplier 542 and scale factors Ku and KI. The full spectrum power factor is calculated using division block 544, the output distortion power is calculated using squaring blocks 546, 548 and 550 and square root block 551, and the full spectrum active energy is calculated using summation block 552.

The fundamental RMS voltage is calculated using square root block 560 and multiplier 562 to apply scale factor KU, and the fundamental RMS current is calculated using square root block 564 and multiplier 566 to apply scale factor KI. The fundamental real power Pfund is calculated using multiplier 568 to apply scale factor KU and KI, and the fundamental reactive power Qfund is calculated using multiplier 570. Apparent power Sfund is calculated using multiplier 572, the fundamental power factor PF fund is calculated using divider 574, and the sine of the phase angle between the voltage and the current waveforms is calculated using division block 576. Arctangent block 578 is used to calculate the phase angle between the voltage and current waveforms. It should be understood that the example calculations illustrated in block diagram 500 is just one of many example embodiments. In alternative embodiments of present invention, different measurements may be calculated using different implementations. For example, in some systems, power measurements may be made only at fundamental frequencies, or power measurements may be made only using full-spectrum measurements.

Figure 8:
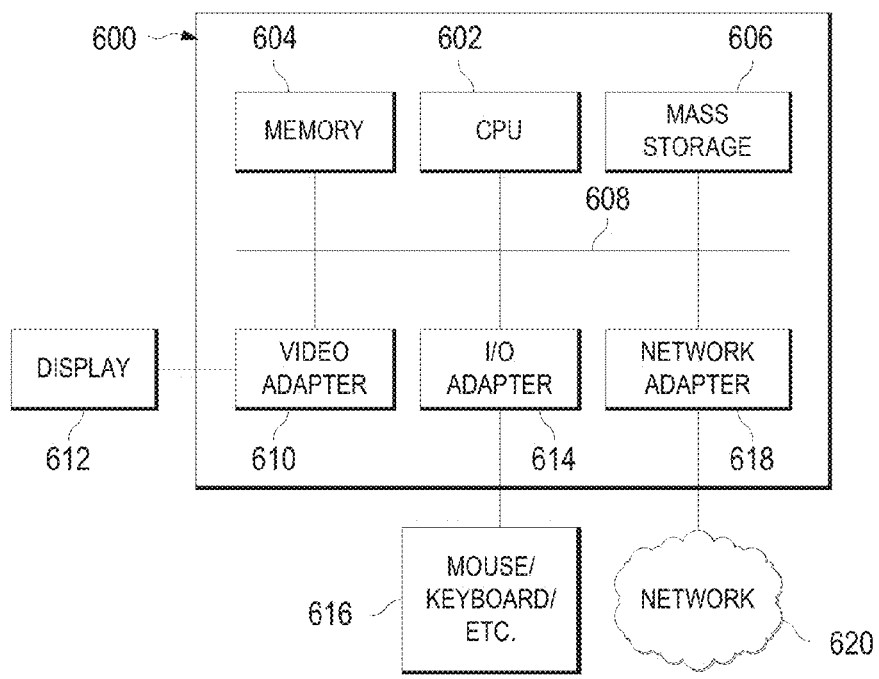
FIG. 8 illustrates a block diagram of an embodiment processing system.

Referring now to FIG. 8, a block diagram of a processing system 600 is provided in accordance with an embodiment of the present invention. The processing system 600 depicts a general-purpose platform and the general components and functionality that may be used to implement portions of the smart meter and/or a computer or processing device used by the verifying authority. The processing system 600 may include, for example, a central processing unit (CPU) 602, memory 604, and a mass storage device 606 connected to a bus 608 configured to perform the processes discussed above. The processing system 600 may further include, if desired or needed, a video adapter 610 to provide connectivity to a local display 612 and an input-output (I/O) Adapter 614 to provide an input/output interface for one or more input/output devices 616, such as a mouse, a keyboard, printer, tape drive, CD drive, or the like.

The processing system 600 also includes a network interface 618, which may be implemented using a network adaptor configured to be coupled to a wired link, such as an Ethernet cable or the like, and/or a wireless link such as a cellular, Wi-Fi, Zigbee or other links for communications with a network 620. The network interface 618 may also comprise a suitable receiver and transmitter for wireless communications. It should be noted that the processing system 600 may include other components. For example, the processing system 600 may include power supplies, cables, a motherboard, removable storage media, cases, and the like. These other components, although not shown, are considered part of the processing system 600.

In accordance with an embodiment, a method of operating a processor includes operating in a first operating mode that prohibits access to a protected memory area, receiving a priority interrupt (PI) signal, operating in a second operating mode in response to receiving the PI signal, and executing a first routine by asserting a semi-privileged interrupt (SPI).

Access to the protected memory area is permitted in the second operating mode, and the first routine operates in the second operating mode and is interruptible by the PI signal.

The method may further include writing first data into the protected memory area while operating in the second operating mode, and executing the first routine may include reading the first data from the protected memory area. In some embodiments, executing the first routine also includes computing an encryption signature on the first data, and writing the encryption signature to a first interface, which may include writing the encryption signature to a memory or writing the encryption signature to a communication interface.

In an embodiment, the PI signal is a non-maskable interrupt (NMI) signal, and the SPI signal is an interrupt signal one priority lower than the NMI signal. Receiving the PI signal may include receiving the PI signal from a first data interface when the data interface has first data ready to read. In addition, the method may also include reading the first data from the first data interface, and storing the first data in the protected memory area. In some embodiments, reading the first data from the first data interface includes reading the first data from an analog-to-digital (A/D) converter.

In accordance with a further embodiment, a system includes a processor having a priority interrupt (PI) input configured to receive a PI signal. The system is configured to operate in a first operating mode that prohibits access to a protected memory area, operate in a second operating mode in response to receiving the PI signal, and execute a first routine by asserting a semi-privileged interrupt (SPI). Access to the protected memory area is permitted in the second operating mode, and the first routine operates in the second operating mode and is interruptible by the PI signal. The system may further include a control unit coupled to the protected memory area that is configured to prevent access to the protected memory area when the system operates in the first operating mode. In an embodiment, the PI signal is a non-maskable interrupt (NMI) signal, and the SPI signal is an interrupt signal one priority lower than the NMI signal.

In an embodiment, the system is further configured to write first data into the protected memory area while operating in the second operating mode, and execute the first routine comprises reading the first data from the protected memory area. The system may further include a first interface, and the first routine may be configured to compute an encryption signature on the first data, and write the encryption signature to the first interface. The first interface may include, for example, a memory interface and/or a communication interface.

In an embodiment, the system further includes an analog-to-digital (A/D) converter configured to provide the first input data, system is further configured to assert the PI signal when the A/D converter has performed a conversion. The system may be further configured to assert the SPI signal within a first time period after receiving the PI signal for a first percentage of received PI signals.

In accordance with a further embodiment, an electronic meter includes an analog front-end (AFE) configured to be coupled to a sensor, a processor coupled to the data output interface and the priority signal output of the AFE, and a memory coupled to the processor. The AFE comprises a data output interface and a priority interrupt (PI) signal output. In an embodiment, the processor is configured to operate in a first operating mode that prohibits access to a protected memory area, operate in a second operating mode in response to the PI signal being asserted by the AFE, write first data to the protected memory area while operating in the second operating mode and execute an encrypted data signature routine by asserting a semi-privileged interrupt (SPI). Access to the protected memory area is permitted in the second operating mode, the encrypted data signature routine operates in the second operating mode, the encrypted data signature routine is interruptible by the PI signal, and the data signature is configured to generate an encrypted data signature for the first data. In an embodiment, the PI signal is a non-maskable interrupt (NMI) signal, and the SPI signal is an interrupt signal one priority lower than the NMI signal In an embodiment, the first data includes raw data samples provided by the AFE at the data output interface. The processor may be further configured to perform calculations on the raw data samples provided by the AFE to form calculated data, such that the first data includes the calculated data. In an embodiment, the electric meter further includes a communication interface, and the processor is further configured to write the encrypted data signature for the first data, and the first data to the communication interface.

In an embodiment, the electronic meter is implemented as an electric meter, and the data output interface of the AFE is configured to provide data samples representing measured currents and voltages.

An advantage of embodiments includes the ability for a third party to securely verify the validity of metered data. Another advantage includes the ability to securely data using routines of varying lengths of time without tampering by unauthorized users and malicious software. Further advantages of embodiments include the ability for a system to maintain a certain protection level while remaining interruptible and being able to fulfill hard real-time scheduling or control requirements.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a processor, the method comprising:
   operating in a first operating mode that prohibits access to a protected memory area;
   receiving a priority interrupt (PI) signal from a first data interface when the first data interface has first data ready to read;
   operating in a second operating mode in response to receiving the PI signal, wherein access to the protected memory area is permitted in the second operating mode;
   reading the first data from the first data interface;
   storing the first data in the protected memory area; and
   executing a first routine by asserting a semi-privileged interrupt (SPI) signal, wherein the first routine operates in the second operating mode and is interruptible by the PI signal.

2. The method of claim 1, wherein:
   executing the first routine comprises reading the first data from the protected memory area.

3. The method of claim 1, wherein:
   the PI signal is a non-maskable interrupt (NMI) signal; and
   the SPI signal is an interrupt signal one priority lower than the NMI signal.

4. The method of claim 1, wherein reading the first data from the first data interface comprises reading the first data from an analog-to-digital (A/D) converter.

5. A method of operating a processor, the method comprising:
operating in a first operating mode that prohibits access to a protected memory area;
receiving a priority interrupt (PI) signal;
operating in a second operating mode in response to receiving the PI signal, wherein access to the protected memory area is permitted in the second operating mode;
writing first data into the protected memory area while operating in the second operating mode:
executing a first routine by asserting a semi-privileged interrupt (SPI), wherein the first routine operates in the second operating mode and is interruptible by the PI signal, the first routine comprising:
reading the first data from the protected memory area;
computing an encryption signature on the first data; and
writing the encryption signature to a first interface.

6. The method of claim 5, wherein writing the encryption signature to the first interface comprises writing the encryption signature to a memory.

7. The method of claim 5, wherein writing the encryption signature to the first interface comprises writing the encryption signature to a communication interface.

8. The method of claim 5, wherein:
a PI signal is a non-maskable interrupt (NMI) signal; and
the SPI signal is an interrupt signal of a lower priority than the NMI signal.

9. A system comprising:
a first data interface; and
a processor comprising a priority interrupt (PI) input configured to receive a PI signal from the first data interface when the first data interface has first data ready to read, wherein the processor is configured to
operate in a first operating mode that prohibits access to a protected memory area,
operate in a second operating mode in response to receiving the PI signal, wherein access to the protected memory area is permitted in the second operating mode,
read the first data from the first data interface,
store the first data in the protected memory area, and
execute a first routine by asserting a semi-privileged interrupt (SPI) signal, wherein the first routine operates in the second operating mode and is interruptible by the PI signal.

10. The system of claim 9, further comprising a control unit coupled to the protected memory area, wherein the control unit is configured to prevent access to the protected memory area when the system operates in the first operating mode.

11. The system of claim 9, wherein:
the PI signal is a non-maskable interrupt (NMI) signal; and
the SPI signal is an interrupt signal one priority lower than the NMI signal.

12. The system of claim 9,
wherein executing the first routine comprises reading the first data from the protected memory area.

13. A system comprising:
a first interface; and
a processor comprising a priority interrupt (PI) input configured to receive a PI signal, wherein the processor is configured to
operate in a first operating mode that prohibits access to a protected memory area,
operate in a second operating mode in response to receiving the PI signal, wherein access to the protected memory area is permitted in the second operating mode,
write first data into the protected memory area while operating in the second operating mode, and
execute a first routine by asserting a semi-privileged interrupt (SPI), wherein the first routine operates in the second operating mode and is interruptible by the PI signal, wherein the first routine is configured to read the first data from the protected memory area, compute an encryption signature on the first data, and
write the encryption signature to the first interface.

14. The system of claim 13, wherein the first interface comprises a memory interface.

15. The system of claim 13, wherein the first interface comprises a communication interface.

16. A system comprising:
a processor comprising a priority interrupt (PI) input configured to receive a PI signal, wherein the processor is configured to
operate in a first operating mode that prohibits access to a protected memory area,
operate in a second operating mode in response to receiving the PI signal, wherein access to the protected memory area is permitted in the second operating mode,
write first data into the protected memory area while operating in the second operating mode, and
execute a first routine by asserting a semi-privileged interrupt (SPI), wherein the first routine operates in the second operating mode and is interruptible by the PI signal, wherein the first routine is configured to read the first data from the protected memory area; and
an analog-to-digital (A/D) converter configured to provide the first data, and wherein the system is further configured to assert the PI signal when the A/D converter has performed a conversion.

17. A system comprising:
a processor comprising a priority interrupt (PI) input configured to receive a PI signal, wherein the processor is configured to
operate in a first operating mode that prohibits access to a protected memory area,
operate in a second operating mode in response to receiving the PI signal, wherein access to the protected memory area is permitted in the second operating mode,
write first data into the protected memory area while operating in the second operating mode,
execute a first routine by asserting a semi-privileged interrupt (SPI) signal, wherein the first routine operates in the second operating mode and is interruptible by the PI signal, wherein the first routine is configured to read the first data from the protected memory area, and
assert the SPI signal within a first time period after receiving the PI signal for a first percentage of received PI signals.

18. An electronic meter comprising:
an analog front-end (AFE) configured to be coupled to a sensor, wherein the AFE comprises a data output interface and a priority interrupt (PI) signal output;

a processor coupled to the data output interface and the PI signal output of the AFE; and a memory coupled to the processor, wherein the processor is configured to operate in a first operating mode that prohibits access to a protected memory area, operate in a second operating mode in response to the PI signal being asserted by the AFE, wherein access to the protected memory area is permitted in the second operating mode, write first data to the protected memory area while operating in the second operating mode, and execute an encrypted data signature routine by asserting a semi-privileged interrupt (SPI) signal, wherein the encrypted data signature routine operates in the second operating mode, the encrypted data signature routine is interruptible by the PI signal, and the encrypted data signature routine is configured to generate an encrypted data signature for the first data.

19. The electronic meter of claim 18, wherein the first data comprises raw data samples provided by the AFE at the data output interface.

20. The electronic meter of claim 19, wherein:

the processor is further configured to perform calculations on the raw data samples provided by the AFE to form calculated data; and the first data comprises the calculated data.

21. The electronic meter of claim 18, further comprising a communication interface, wherein the processor is further configured to write the encrypted data signature for the first data, and the first data to the communication interface.

22. The electronic meter of claim 18, wherein:

the electronic meter comprises an electric meter; and the data output interface of the AFE is configured to provide data samples representing measured currents and voltages.

23. The electronic meter of claim 18, wherein the PI signal is a non-maskable interrupt (NMI) signal; and the SPI signal is an interrupt signal one priority lower than the NMI signal.

24. A method of operating a processor, the method comprising:

operating in a first operating mode that prohibits access to a protected memory area;

receiving a plurality of periodic priority interrupt (PI) signals;

operating in a second operating mode in response to receiving one of the plurality of PI signals, wherein access to the protected memory area is permitted in the second operating mode; and executing a first routine by asserting a semi-privileged interrupt (SPI) signal, wherein the first routine operates in the second operating mode and is interruptible by a subsequent PI signal;

wherein:

a PI signal is a non-maskable interrupt (NMI) signal; and the SPI signal is an interrupt signal of a lower priority than the NMI isgnal.

25. The method of claim 24, wherein executing the first routine comprises:

reading first data from the protected memory area;

computing an encryption signature on the first data; and writing the encryption signature to a second interface.

26. The method of claim 25, wherein writing the encryption signature to the second interface comprises writing the encryption signature to a memory or a communication interface.

27. The method of claim 24, further comprising:

receiving a PI interrupt while executing the first routine;

suspending execution of the first routine;

executing a second routine in response to receiving the PI interrupt, the second routine storing data received from an analog-to-digital (A/D) converter into the protected memory area; and resuming execution of the first routine.

28. The method of claim 24, wherein operating in the second operating mode comprises:

reading first data from an analog-to-digital (A/D) converter; and storing the first data in the protected memory area.

* * * * *